United States Patent
Kobayashi et al.

(10) Patent No.: US 11,587,775 B2
(45) Date of Patent: Feb. 21, 2023

(54) ION DETECTOR

(71) Applicant: HAMAMATSU PHOTONICS K.K., Hamamatsu (JP)

(72) Inventors: Hiroshi Kobayashi, Hamamatsu (JP); Sayaka Takatsuka, Hamamatsu (JP); Yuuya Washiyama, Hamamatsu (JP); Yuto Yanagihara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 94 days.

(21) Appl. No.: 16/878,179

(22) Filed: May 19, 2020

(65) Prior Publication Data
US 2020/0373136 A1 Nov. 26, 2020

(30) Foreign Application Priority Data

May 21, 2019 (JP) .................................. 2019-095318

(51) Int. Cl.
*H01J 49/02* (2006.01)
*G01T 1/29* (2006.01)

(52) U.S. Cl.
CPC .............. *H01J 49/025* (2013.01); *G01T 1/29* (2013.01)

(58) Field of Classification Search
CPC .......... H01J 49/025; G01T 1/24; G01T 1/244; G01T 1/248; G01T 1/29
See application file for complete search history.

(56) References Cited

U.S. PATENT DOCUMENTS

| 7,655,891 | B2 * | 2/2010 | Suzuki | ................... | H01J 49/025 |
| | | | | | 250/214 VT |
| 8,294,089 | B2 * | 10/2012 | Suzuki | ................... | H01J 49/025 |
| | | | | | 250/281 |
| 2009/0236517 | A1 * | 9/2009 | Suzuki | ................... | H01J 49/025 |
| | | | | | 250/287 |
| 2013/0314839 | A1 * | 11/2013 | Terashima | ............... | H01G 4/33 |
| | | | | | 361/301.4 |

FOREIGN PATENT DOCUMENTS

| JP | H6-028997 A | 2/1994 |
| JP | 09017691 A * | 1/1997 |
| JP | 2001-273867 A | 10/2001 |
| JP | 2003-051420 A | 2/2003 |
| JP | 5049174 B2 | 10/2012 |

* cited by examiner

*Primary Examiner* — David E Smith
(74) *Attorney, Agent, or Firm* — Faegre Drinker Biddle & Reath LLP

(57) ABSTRACT

An ion detector according to this embodiment has a structure for reducing influences of signal reflection or the like on an output signal. The ion detector comprises an electron multiplier, a signal output unit, a signal output terminal, and an AC coupler. The AC coupler is disposed on a signal line between the signal output unit and the signal output terminal, including a resin sheet and a pair of conductive sections facing each other with the resin sheet interposed therebetween. One conductive section is electrically connected to an output terminal of the signal output unit, and the other conductive section is electrically connected to the signal output terminal.

5 Claims, 15 Drawing Sheets

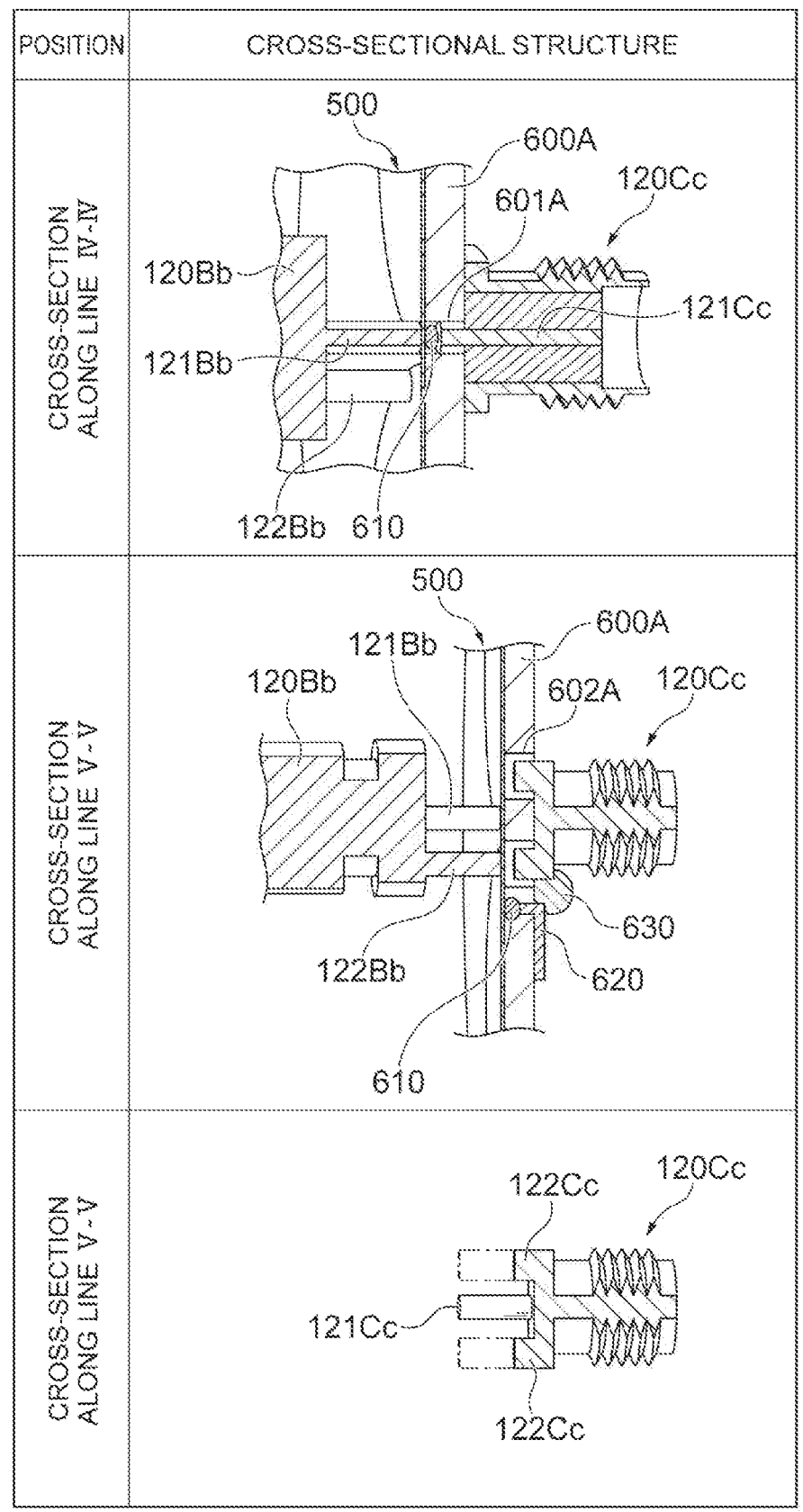

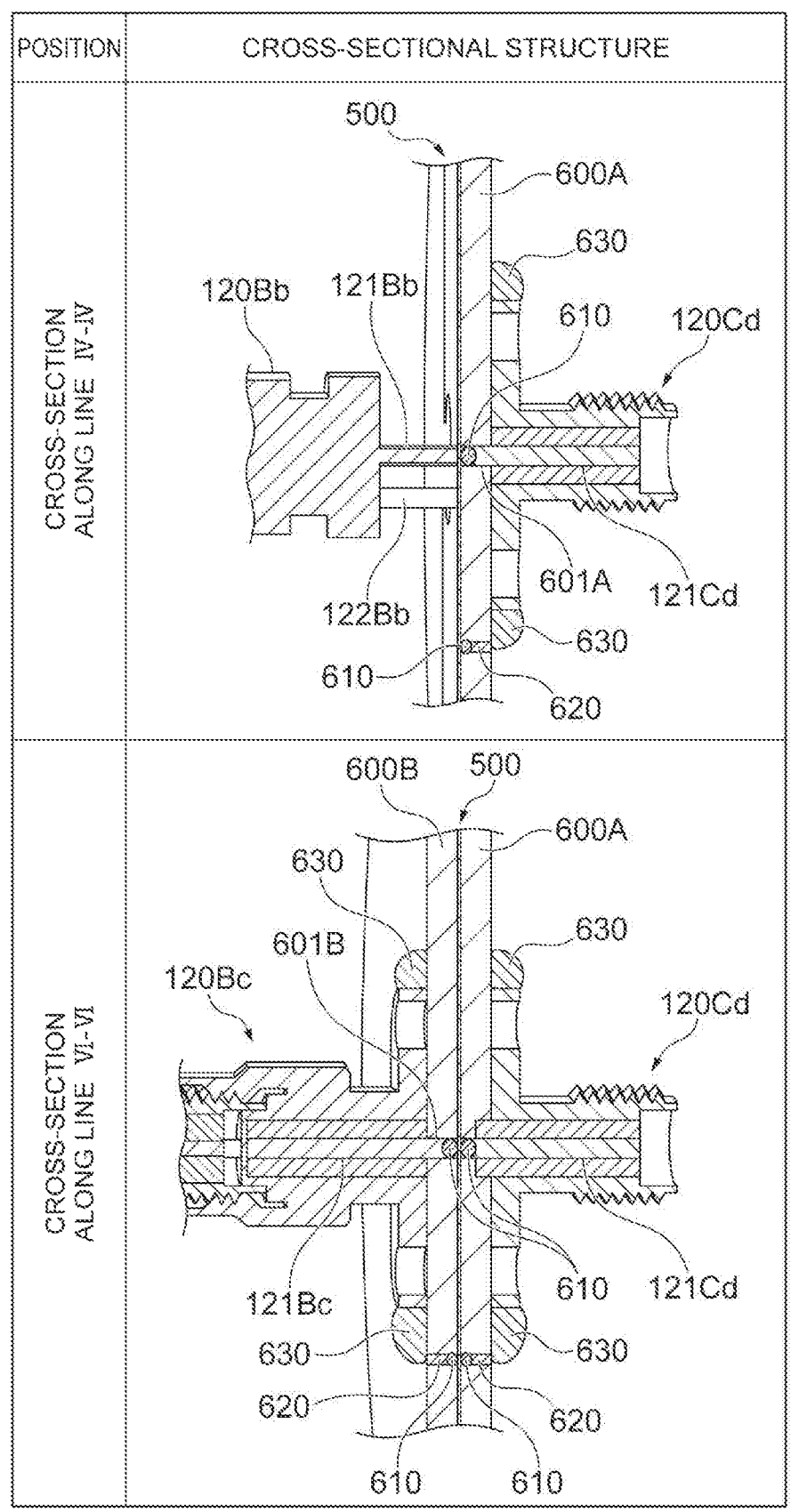

ION DETECTOR

TECHNICAL FIELD

The present invention relates to an ion detector.

BACKGROUND

A known example of an ion detector applicable to a mass spectrometry or the like includes an ion detector provided with an input element that emits electrons in response to incident ions and an output element (signal output unit) that captures the emitted electrons and outputs as electric signals. As the input element, an electron multiplier such as a microchannel plate (hereinafter referred to as "MCP") is known. As the output element, an electron impact diode such as an avalanche diode (hereinafter referred to as "AD") is known as well as an anode serving as an electron capture electrode. Particularly, in such an ion detector as disclosed in, for example, Japanese Patent Application Laid-Open No. 2009-230999 (Patent Document 1), an AC coupler (an AC coupling circuit including a capacitor or the like) for extracting an alternating current component (hereinafter referred to as an "AC component") as a signal is disposed between an output element and a signal output terminal (a terminal electrically connected to an external electronic circuit) of the ion detector.

SUMMARY

As a result of studies on the ion detector in the related art, the present inventors have found the following problem. That is, in the mass spectrometry, bipolar ions (charged particles) are to be detected. For example, when an ion detector detects negative ions by AC coupling between an output element and the ion detector, the output element (for example, an anode) that outputs a signal is at a high voltage. Accordingly, an AC component is taken out as the signal while an AC coupler ensures a withstand voltage. In particular, a time-of-flight mass spectrometer (hereinafter referred to as "TOF-MS") should transmit high-frequency signals without distortion. However, when an AC coupler includes a commercially available capacitor or the like, it is difficult to obtain in a vacuum a withstand voltage as specified. Furthermore, it is difficult to transmit output signals (high-frequency signals) without distortion due to influences of, for example, inherent inductance components and signal reflection.

The present invention has been made to solve the problem, and an object of the present invention is to provide an ion detector including a structure that reduces influences (waveform distortion) of signal reflection or the like on output signals.

An ion detector according to this embodiment comprises all ion detectors that require AC coupling, specifically, an electron multiplier, a signal output unit, a signal output terminal, and an AC coupler. The electron multiplier emits electrons in response to incident charged particles. The signal output unit is arranged at a position which electrons emitted from the electron multiplier reach. The signal output unit receives the electrons and outputs an electric signal. The signal output terminal is a terminal electrically connected to an external electronic circuit and connected to an output terminal of the signal output unit via a signal line. The AC coupler is disposed on the signal line. In particular, the AC coupler comprises a resin sheet, a first conductive section, and a second conductive section. The resin sheet has a first main surface facing a side on which the signal output unit is disposed, and a second main surface opposing the first main surface and facing a side on which the signal output terminal is disposed. The first conductive section is disposed on the first main surface of the resin sheet and is electrically connected to an output terminal of the signal output unit. The second conductive section is disposed on the second main surface of the resin sheet in such a manner that at least a part of the second conductive section overlaps with the first conductive section when the resin sheet is viewed along a direction from the first main surface to the second main surface. In other words, the first conductive section and the second conductive section are included in a capacitor. Furthermore, the second conductive section is electrically connected to the signal output terminal.

Each embodiment according to the present invention will be fully understood from the following detailed description and the accompanying drawings. The following Examples are provided for purposes of illustration and not limitation.

Furthermore, the following detailed description will clarify a range of application of the present invention. Although the detailed description and specific examples represent preferred embodiments of the present invention, those examples are for illustration purpose. It is clear that various modifications and amendments within the scope of the present invention are unequivocal for those skilled in the art.

BRIEF DESCRIPTION OF THE DRAWINGS

FIG. 11 is a view for explaining a partial cross-sectional structure of the AC coupler illustrated in FIG. 10A;

FIG. 12 is a view for explaining another example of an SMA jack attachable to the AC coupler illustrated in FIG. 10A and a partial cross-sectional structure of the AC coupler illustrated in FIG. 10B;

DETAILED DESCRIPTION

Embodiment of the Present Invention

Figure 1A:
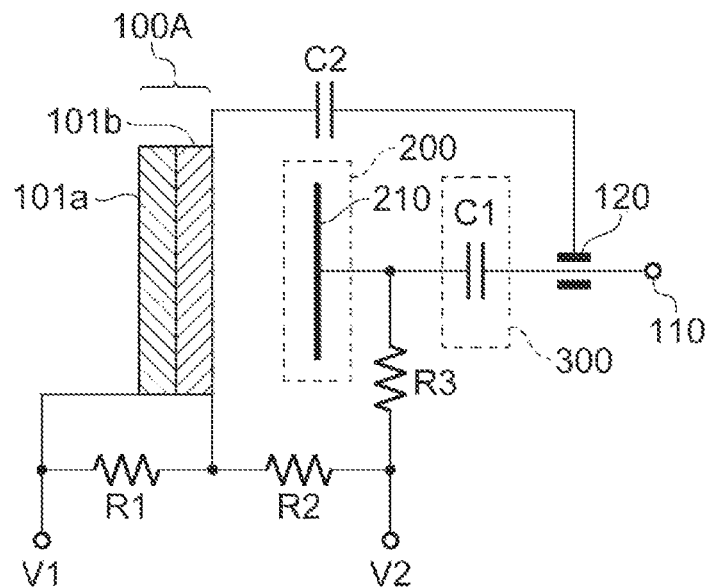
FIGS. 1A and 1B are views illustrating various configuration examples of an ion detector including an electron multiplier.

First, the contents of embodiments of the present invention will be separately recited and described.

(1) As an aspect of this embodiment, an ion detector comprises an electron multiplier, a signal output unit, a signal output terminal, and an AC coupler. The electron multiplier emits electrons in response to incident charged particles. The signal output unit is arranged at a position which electrons emitted from the electron multiplier reach. The signal output unit receives the electrons and outputs an electric signal. The signal output terminal is a terminal electrically connected to an external electronic circuit and connected to an output terminal of the signal output unit via a signal line. The AC coupler is disposed on the signal line. In particular, the AC coupler comprises a resin sheet, a first conductive section, and a second conductive section. The resin sheet has a first main surface facing a side on which the signal output unit is disposed, and a second main surface opposing the first main surface and facing a side on which the signal output terminal is disposed. The first conductive section is disposed on the first main surface of the resin sheet and is electrically connected to an output terminal of the signal output unit. The second conductive section is disposed on the second main surface of the resin sheet in such a manner that at least a part of the second conductive section overlaps with the first conductive section when the resin sheet is viewed along a direction from the first main surface to the second main surface. In other words, the first conductive section and the second conductive section are included in a capacitor. Furthermore, the second conductive section is electrically connected to the signal output terminal.

(2) As an aspect of this embodiment, the AC coupler may further comprise a first protective film and a second protective film. The first protective film is disposed on the first main surface of the resin sheet while covering at least a part of the first conductive section. The second protective film is disposed on the second main surface of the resin sheet while covering at least a part of the second conductive section.

(3) As an aspect of this embodiment, the first protective film and the second protective film each preferably include a resin material. Furthermore, as an aspect of this embodiment, the resin material is preferably one of a liquid crystal polymer, a polyester film, a polyimide, and a polyamide.

(4) As an aspect of this embodiment, the AC coupler may further comprise a first insulating reinforcer brought into contact with the second main surface of the resin sheet. Furthermore, as an aspect of this embodiment, the AC coupler may further comprise a second insulating reinforcer that is brought into contact with the first main surface of the resin sheet. According to these aspects, the reinforcer comes in contact with the first main surface, the second main surface, or both the first main surface and the second main surface of the resin sheet.

(5) As an aspect of this embodiment, the signal output unit preferably includes one of an AD and an anode. In particular, when the signal output unit includes an anode, the first conductive section preferably functions as the anode.

(6) As an aspect of this embodiment, the electron multiplier preferably includes one of an MCP unit including one or more MCPs, a channel electron multiplier (CEM), and a dynode unit including a plurality of multi-stage dynodes.

As described above, each aspect recited in [Embodiment of the Present Invention] is applicable to other aspects or any combinations of the aspects.

Details of Embodiment of the Present Invention

Hereinafter, a specific structure of the ion detector according to this embodiment will be described in detail with reference to the accompanying drawings. Note that the present invention is not limited to these examples but represented by the claims and intended to include contents equivalent to the claims and all modifications within the scope of the claims. Note that the same elements in descriptions of the drawings will be denoted by the same reference numerals, and redundant descriptions thereof will be omitted.

Basic Structure

Figure 1B:
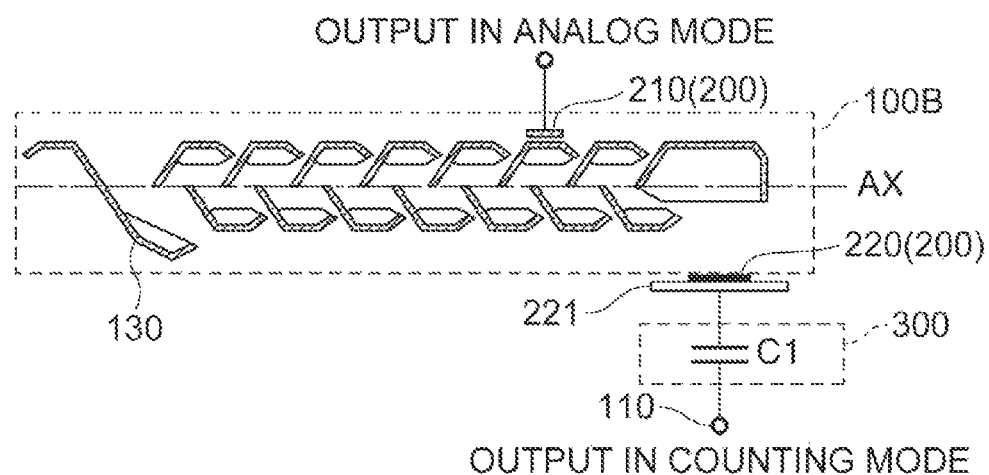

FIGS. 1A and 1B are views illustrating various configuration examples (basic structures) of an ion detector including an electron multiplier. As a basic structure, each of the ion detectors illustrated in FIGS. 1A and 1B includes an input element, an output element, a signal output terminal, and an AC coupler disposed on a signal line between the output element and the signal output terminal.

Specifically, in the ion detector illustrated in FIG. 1A, the input element includes an MCP unit 100A serving as an electron multiplier that includes an input surface 101a and an output surface 101b. In FIG. 1A, for example, the MCP unit 100A includes two MCPs. The output element includes an anode 210 (electron capture electrode) serving as a signal output unit 200. An AC coupler 300 is disposed between the anode 210 and a signal output terminal 110. The AC coupler 300 includes a capacitor C1 (hereinafter referred to as "signal capacitor") for extracting high-frequency signals from the anode 210. In addition, between the AC coupler 300 and the signal output terminal 110, there is provided an SMA connector 120 included in a part of the signal line and in a part of a return path for removing noise. Resistances R1 and R2 (voltage dividing resistances) connected in series are disposed between a first reference terminal set to have a potential V1 and a second reference terminal set to have a potential V2. The input surface 101a is set to have the potential V1 when electrically connected to the first reference terminal. The output surface 101b is electrically connected to a node between the resistances R1 and R2. A node between the anode 210 and the signal capacitor C1 is connected to the second reference terminal via a resistance R3.

Furthermore, in the example illustrated in FIG. 1A, a capacitor C2 is disposed between the output surface 101b of the MCP unit 100A and the SMA connector 120. The capacitor C2 is included in a low-impedance loop for high-frequency signals and has an effect of preventing an instantaneous voltage drop on the output surface 101b of the MCP unit 100A when a large amount of ion reaches the MCP unit 100A. In other words, when an instantaneous voltage drop occurs on the output surface 101b of the MCP unit 100A, a direct current component (hereinafter referred to as "DC component") caused by this voltage drop is reflected in a signal (output voltage) outputted from the anode 210 to the signal output terminal 110. Accordingly, the capacitor C2 disposed between the output surface 101b of the MCP unit 100A and the SMA connector 120 cancels fluctuations in DC component reflected in an output signal. Note that a wire that connects the output surface 101b of the MCP unit 100A and a side surface of the SMA connector 120 is included in a part of the return path.

The ion detector illustrated in FIG. 1B includes, for example, a dynode unit 100B serving as an electron multiplier (input element), a signal output unit 200 serving as an output element, and an AC coupler 300. The dynode unit 100B in FIG. 1B includes a plurality of dynodes 130 arranged along an axis AX. Furthermore, the ion detector in FIG. 1B includes both an anode 210 and an avalanche diode 220 (hereinafter referred to as "AD") as the signal output unit 200. The AD 220 is mounted on a printed wiring board 221. In the example illustrated in FIG. 1B, the dynodes 130 disposed between the anode 210 and the AD 220 serve as gate electrodes, which enables switching between output in analog mode and output in counting mode. The AD 220 is disposed on the printed wiring board 221, and a capacitor C1 serving as the AC coupler 300 is disposed on a signal line between an output terminal of the AD 220 and a signal output terminal 110.

Figure 2A:
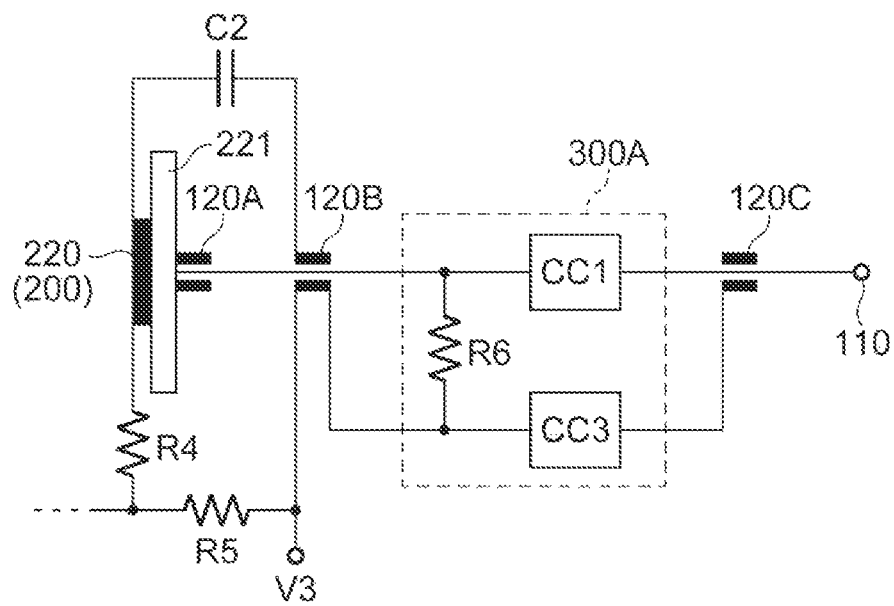
FIGS. 2A and 2B are views illustrating a configuration example of AC coupling using a chip capacitor.
Figure 2B:
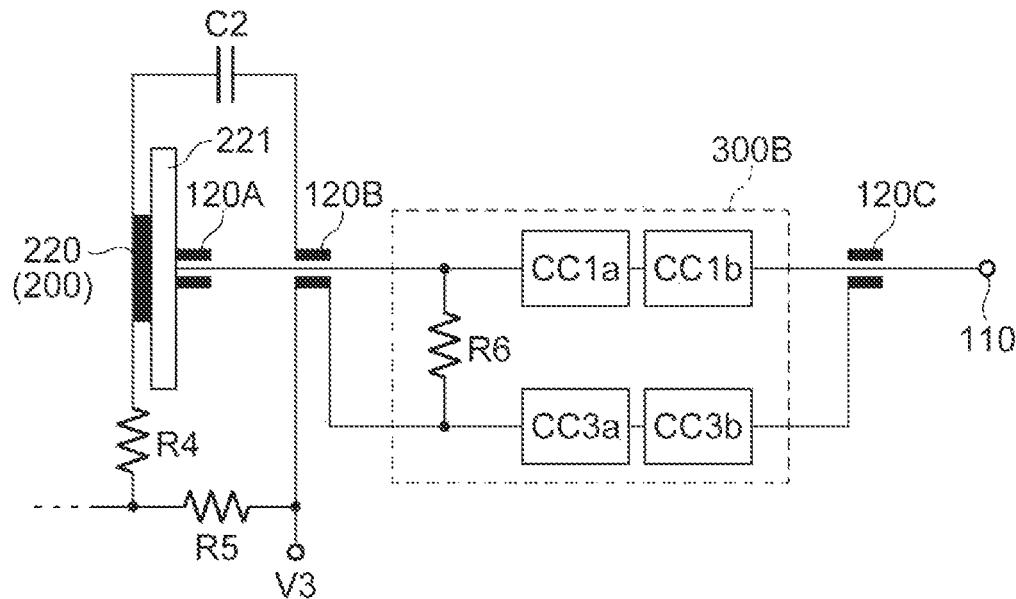

Next, FIGS. 2A and 2B illustrate configuration examples in which an AD 220 and a chip capacitor are employed as a signal output unit 200 and an AC coupler 300A to be employed in the ion detector illustrated in FIG. 1A. An electron multiplier and the periphery thereof not illustrated in FIGS. 2A and 2B have circuit configurations similar to those of the MCP unit 100A, the resistance R1, and the first reference terminal set to have the potential V1 illustrated in FIG. 1A.

In the example illustrated in FIG. 2A, the AD 220 serving as the signal output unit 200 is mounted on an upper surface of a printed wiring board 221. An SMA jack 120A included in a part of a signal line is attached to a lower surface of the printed wiring board 221. A third reference terminal set to have a potential V3 is connected to a second reference terminal via the resistance R1 (FIG. 1A) and a resistance R5 connected in series. A node between the resistance R1 and the resistance R5 is connected to an electron entrance surface of the AD 220 via a resistance R4. An SMA plug 120B and an SMA jack 120C are disposed on the signal line connecting the AD 220 and a signal output terminal 110. The SMA plug 120B is fixed to the printed wiring board 221 via the SMA jack 120A attached to the printed wiring board 221.

The AC coupler 300A is disposed between the SMA plug 120B and the SMA jack 120C. The AC coupler 300A includes a chip capacitor CC1 (corresponding to the signal capacitor C1 in FIG. 1A), a chip capacitor CC3 disposed on a return path, and a resistance R6 that fixes an output potential of the AD 220. The chip capacitor CC1, as a signal capacitor, is disposed on the signal line. The chip capacitor CC3 is a noise countermeasure capacitor (that eliminates influences of fluctuations in DC component) arranged in parallel with the chip capacitor CC1, being disposed on a line (included in a part of the return path) that connects a side surface of the SMA plug 120B and a side surface of the SMA jack 120C. Hereinafter, a capacitor disposed on the return path is referred to as "return capacitor." A capacitor C2 for removing noise is disposed on a wire (included in a part of the return path) that connects the electron entrance surface of the AD 220 and the side surface of the SMA plug 120B. The capacitor C2 is disposed on the return path between an input electrode of the AD 220 and the side surface of the SMA plug 120B and eliminates influences on an output signal caused by a voltage drop in the electron entrance surface of the AD 220 (that is, fluctuations in DC component caused by electron collision, or noise to be reflected in an output signal). The chip capacitor CC3 eliminates the influences on the output signal due to the fluctuations in DC component. The side surface of the SMA plug 120B is set to have the potential V3, and an input potential of the AD 220 is set to have a potential lower than the potential V3 by an amount equal to a voltage drop due to the resistances R4 and R5.

The configuration example in FIG. 2B is similar to the configuration example in FIG. 2A except that an AC coupler 300B is employed. The AC coupler 300B employs chip capacitors CC1a and CC1b connected in series instead of the chip capacitor CC1 in FIG. 2A. Similarly, the AC coupler 300B employs chip capacitors CC3a and CC3b connected in series instead of the chip capacitor CC3 in FIG. 2A.

Figure 3:
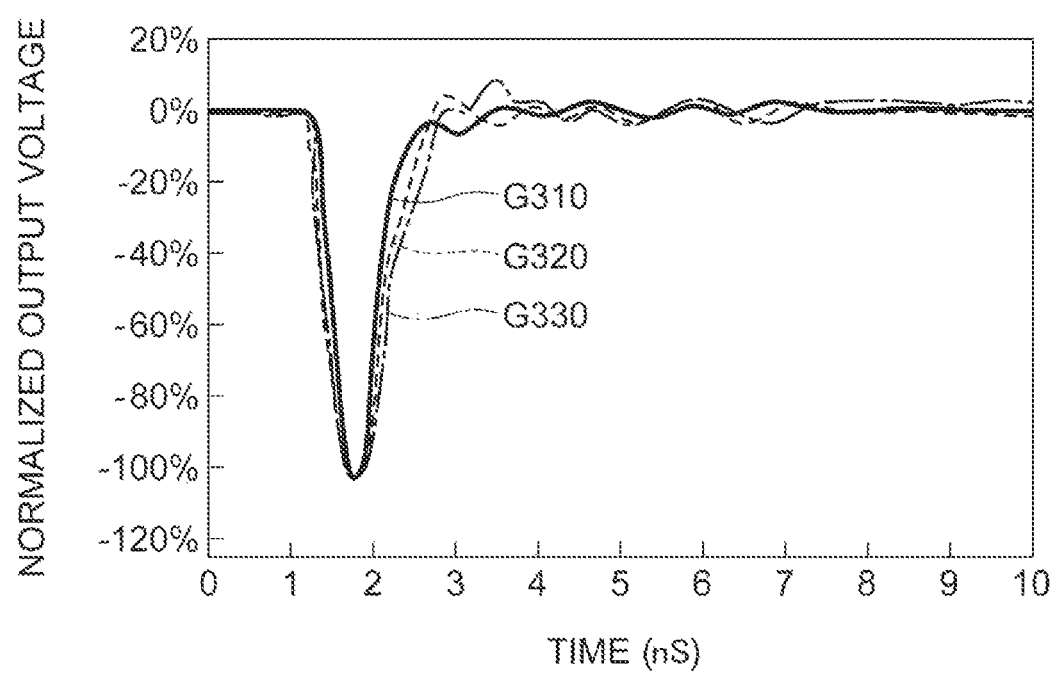
FIG. 3 is a graph for explaining a problem in AC coupling.

FIG. 3 is a graph for explaining a problem in AC coupling, illustrating measurement results (time characteristics of an output voltage) of a plurality of samples including the MCP unit 100A (electron multiplier) illustrated in FIG. 1A and various AC couplers having the aforementioned structure (FIGS. 1A, 2A, and 2B). In FIG. 3, the ordinate represents a normalized output voltage in which the peak of an output voltage of each sample is brought into line with −100%. Specifically, in FIG. 3, a graph G310 shows a measurement result of a first sample (with no connector), a graph G320 shows a measurement result of a second sample (short connector type), and a graph G330 shows a measurement result of a third sample (long connector type). Herein, the first sample (with no connector) has the structure (MCP+ anode) illustrated in FIG. 1A and employs a radial lead capacitor as the capacitor C1. The second sample has the structure (MCP+AD) illustrated in FIG. 1A except that members from the anode 210 to the signal output terminal 110 are changed as illustrated in FIG. 2A. The third sample has the structure (MCP+AD) illustrated in FIG. 1A except that members from the anode 210 to the signal output terminal 110 are changed as illustrated in FIG. 2B.

FIG. 3 shows signal reflection caused by the inductance of the capacitor in any of the measurement results of the first to third samples. In particular, the second sample has larger signal reflection than the first sample, and the third sample has larger signal reflection than the second sample.

Figure 4:
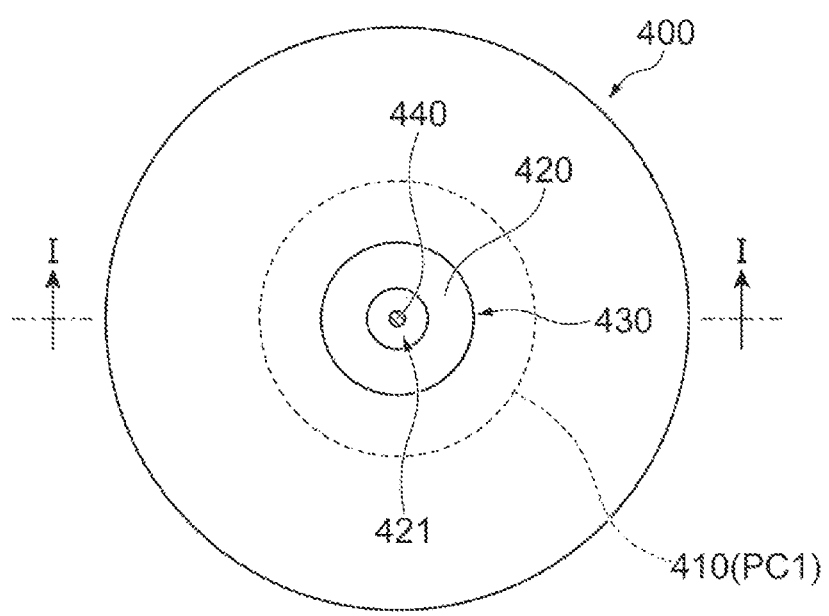
FIG. 4 is a view illustrating a first structure of an AC coupler applicable to an ion detector according to this embodiment.

FIG. 4 is a view illustrating a first structure of an AC coupler employed in the ion detector according to this embodiment. An AC coupler 400 illustrated in FIG. 4 is employable in the ion detectors illustrated in FIGS. 1A and 1B.

Figure 5:
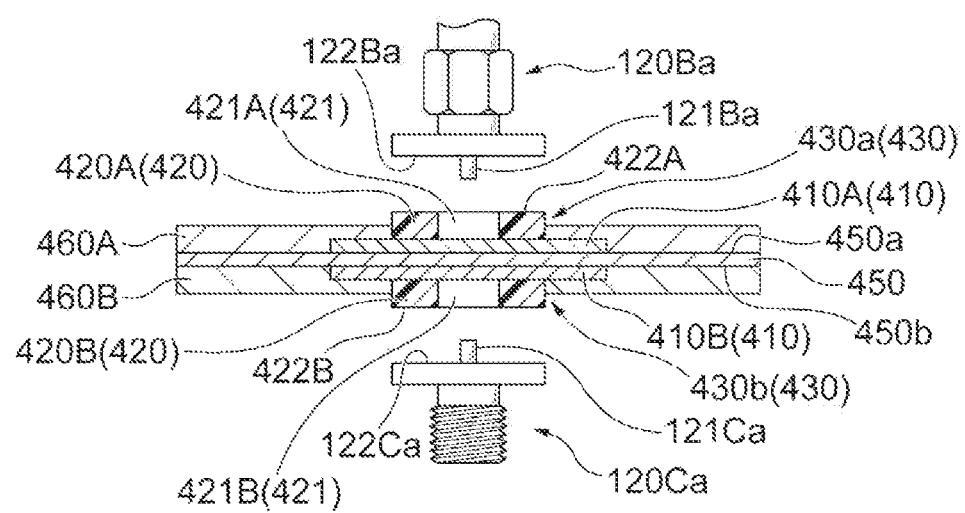
FIG. 5 is a view illustrating a cross-sectional structure of the AC coupler along line I-I illustrated in FIG. 4.

The AC coupler 400 illustrated in FIG. 4 includes a signal capacitor PC1 disposed on a signal line. A pair of electrodes 410 included in the signal capacitor PC1 is exposed from an opening 430 disposed in a protective layer. Through this opening 430, an insulating ring 420 is bonded and fixed to the electrodes 410. The insulating ring 420 includes a through hole 421 that allows a signal terminal of an SMA jack or an SMA plug to penetrate therethrough. The signal terminal comes in contact with the pair of electrodes 410 in a region 440. FIG. 5 illustrates a more specific structure of the AC coupler 400. FIG. 5 is a view illustrating a cross-sectional structure of the AC coupler 400 along line I-I illustrated in FIG. 4.

As illustrated in FIG. 5, the AC coupler 400 includes a resin sheet 450 including main surfaces 450a and 450b that face each other and have the same structure. In other words, an electrode 410A (first conductive section) is disposed on the main surface 450a of the resin sheet 450, and a protective film 460A (first protective film) including an opening 430a is further disposed thereon. An insulating ring 420A including an opening 421A is bonded and fixed to the electrode 410A exposed through the opening 430a. The insulating ring 420A holds an SMA plug 120Ba while a signal terminal 121Ba of the SMA plug 120Ba is in contact with the electrode 410A. The SMA plug 120Ba is provided with the signal terminal 121Ba included in a part of a signal line and provided with a side surface including a contact surface 122Ba included in a part of a return path. When the contact surface 122Ba of the SMA plug 120Ba and a contact surface 422A of the insulating ring 420A are connected and fixed to each other, the SMA plug 120Ba is fixed to the AC coupler 400.

On the other hand, an electrode 410B (second conductive section) is disposed on the main surface 450b of the resin sheet 450, and a protective film 460B (second protective film) including an opening 430b is further disposed thereon. An insulating ring 420B including an opening 421B is bonded and fixed to the electrode 410B exposed through the opening 430b. The insulating ring 420B holds an SMA jack 120Ca while a signal terminal 121Ca of the SMA jack 120Ca is in contact with the electrode 410B. The SMA jack 120Ca is provided with the signal terminal 121Ca included in a part of a signal line and provided with a side surface including a contact surface 122Ca included in a part of a return path. When the contact surface 122Ca of the SMA jack 120Ca and a contact surface 422B of the insulating ring 420B are connected and fixed to each other, the SMA jack 120Ca is fixed to the AC coupler 400.

As a material of the resin sheet 450, preferable examples include a liquid crystal polymer (LCP), a polyester film, a polyimide, and a polyamide. For example, an LCP, a polyester film, a polyimide, and a polyamide have relative permittivity of 3.0, 3.3, 3.1, and 3.7, respectively. Withstand voltages of an LCP, a polyester film, a polyimide, and a polyamide each having a thickness of 100 μm are 300 kV/mm, 300 kV/mm, 400 kV/mm, and 300 kV/mm, respectively. Furthermore, percentages of water absorption of an LCP, a polyester film, a polyimide, and a polyamide are 0.04%, 0.4%, 2.2%, and 1.5%, respectively.

As a condition to be considered in this embodiment, higher relative permittivity is preferable, but 2 to 4 is practical. A withstand voltage is required to be of 100 kV/mm or more. Furthermore, a lower percentage of water absorption is suitable for use in a vacuum state. Taking these points into consideration, an LCP is the most suitable material.

In addition, a capacitor of 100 pF to 200 pF is required to allow passage of high frequencies. For example, when a capacitor of 150 pF is achieved with a material having permittivity of 3.0, a thickness of the resin sheet 450 and an area (square) of the electrodes 410 are calculated for each required withstand voltage. To achieve a withstand voltage of 30 kV, the resin sheet 450 requires a thickness of 200 μm and an electrode area of 34 mm×34 mm. To achieve a withstand voltage of 20 kV, the resin sheet 450 requires a thickness of 100 μm and an electrode area of 24 mm×24 mm. To achieve a withstand voltage of 12 kV, the resin sheet 450 requires a thickness of 50 μm and an electrode area of 17 mm×17 mm. To achieve a withstand voltage of 5 kV, the resin sheet 450 requires a thickness of 25 μm and an electrode area of 12 mm×12 mm. From the above consideration, the resin sheet 450 (a resin sheet 550 to be described) employed in the AC coupler 400 (an AC coupler 500 to be described) employed in this embodiment preferably has a thickness of 25 μm or more and 100 μm or less. Furthermore, the electrodes 410 (electrodes 501 and 502 to be described) preferably have an area of 5 mm×5 mm or more and 30 mm×30 mm or less.

Figure 6A:
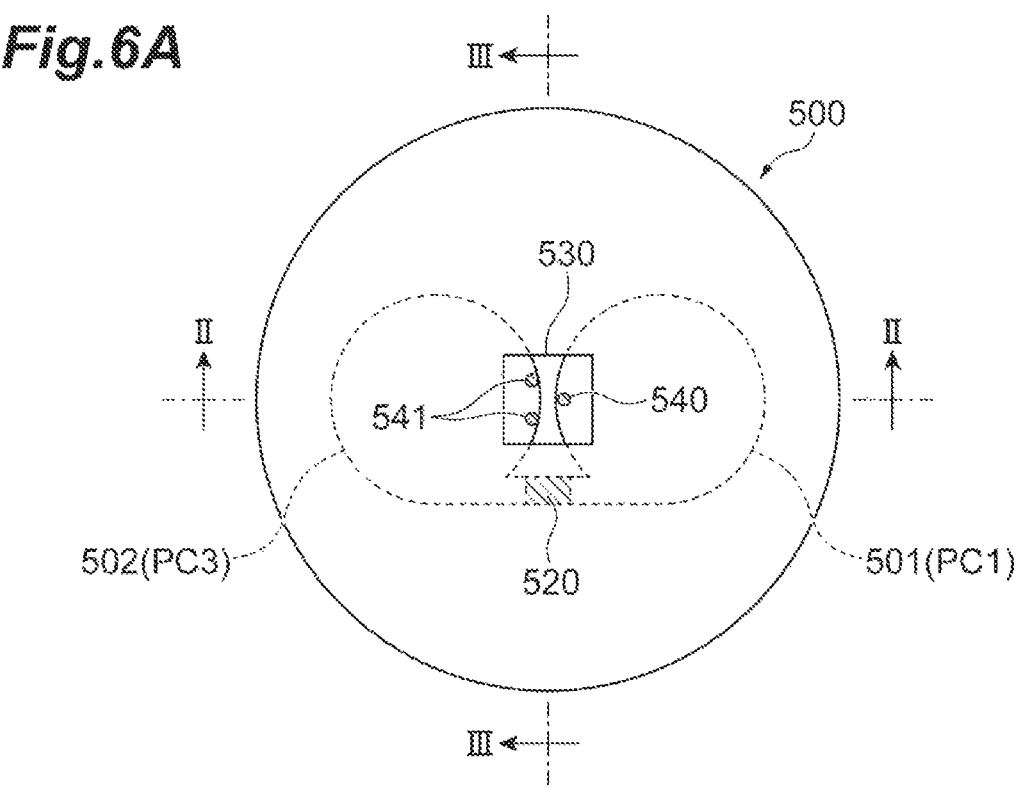
FIGS. 6A to 6C are views illustrating a second structure of the AC coupler applicable to the ion detector according to this embodiment.
Figure 6B:
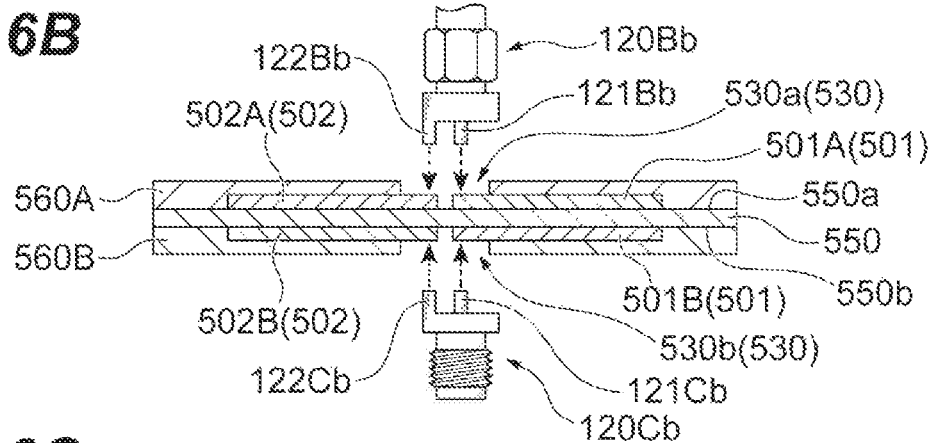
Figure 6C:
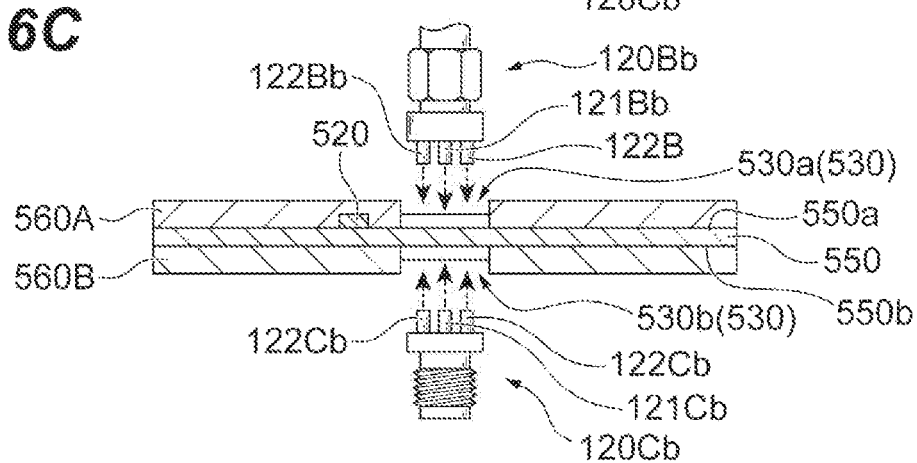

FIGS. 6A to 6C are views illustrating a second structure of the AC coupler employed in the ion detector according to this embodiment. The AC coupler 500 illustrated in each of FIGS. 6A to 6C is applicable to the ion detectors illustrated in FIGS. 1A and 1B.

The AC coupler 500 illustrated in FIG. 6A includes a signal capacitor PC1 disposed on a signal line and a return capacitor PC3 disposed on a return path. A pair of electrodes 501 included in the signal capacitor PC1 is partially exposed from an opening 530 disposed in a protective layer. A pair of electrodes 502 included in the return capacitor PC3 is also partially exposed from the opening 530. One of the pair of electrodes 501 and one of the pair of electrodes 502 are electrically connected via a resistance 520. A signal terminal of an SMA plug or an SMA jack is soldered to a region 540 of the pair of electrodes 501. A return terminal of the SMA plug or SMA jack (included in a part of the return path together with side surfaces of the SMA plug and the SMA jack) is soldered to a region 541 of the pair of electrodes 502. FIGS. 6B and 6C illustrate more specific structures of the AC coupler 500. FIG. 6B is a view illustrating a cross-sectional structure of the AC coupler 500 along line II-II illustrated in FIG. 6A. FIG. 6B is a view illustrating a cross-sectional structure of the AC coupler 500 along line III-III illustrated in FIG. 6A.

As illustrated in FIGS. 6B and 6C, the AC coupler 500 includes the resin sheet 550 having main surfaces 550a and 550b opposing each other. Electrodes 501A and 502A are disposed on the main surface 550a of the resin sheet 550. Furthermore, a protective film 560A having an opening 530a is provided on the electrodes 501A and 502A. An SMA plug 120Bb is soldered to the electrodes 501A and 502A via the opening 530a. Specifically, the SMA plug 120Bb is provided with a signal terminal 121Bb included in a part of a signal line and provided with a side surface including a return terminal 122Bb included in a part of a return path. The signal terminal 121Bb of the SMA plug 120Bb is soldered to the electrode 501A, and the return terminal 122Bb of the SMA plug 120Bb is soldered to the electrode 502A. Accordingly, the SMA plug 120Bb is fixed to the AC coupler 500. As illustrated in FIG. 6C, the electrode 501A and an electrode 501B are electrically connected via the resistance 520. It is preferable that connections between the SMA plug 120Bb and the electrodes 501A and 502A should be reinforced by an adhesive.

On the main surface 550b of the resin sheet 550, the electrode 501B and an electrode 502B are disposed. Furthermore, a protective film 560B having an opening 530b is provided on the electrode 501B and the electrode 502B. Still further, an SMA jack 120Cb is soldered to the electrode 501B and the electrode 502B via the opening 530b. Specifically, the SMA jack 120Cb is provided with a signal terminal 121Cb included in a part of a signal line and provided with a side surface including a return terminal 122Cb included in a part of a return path. The signal terminal 121Cb of the SMA jack 120Cb is soldered to the electrode 501B, and the return terminal 122Cb of the SMA jack 120Cb is soldered to the electrode 502B. Accordingly, the SMA jack 120Cb is fixed to the AC coupler 500. It is preferable that connections between the SMA jack 120Cb and the electrodes 501B and 502B should be reinforced by an adhesive.

In the AC coupler 500 having such a second structure, the resin sheet 550 preferably has a thickness of 25 μm or more and 100 µm or less. Furthermore, the electrodes 501 and 502 preferably have an area of 5 mm×5 mm or more and 30 mm×30 mm or less.

Figure 7A:
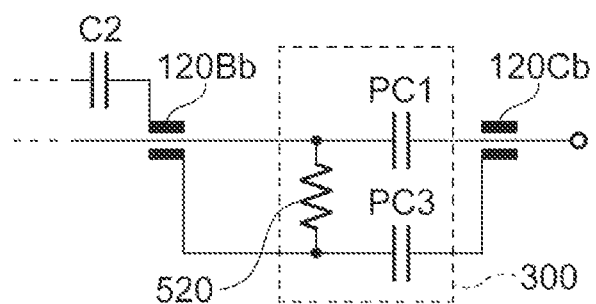
FIGS. 7A to 7C are graphs for explaining effects of the AC coupler illustrated in FIGS. 6A to 6C.
Figure 7B:
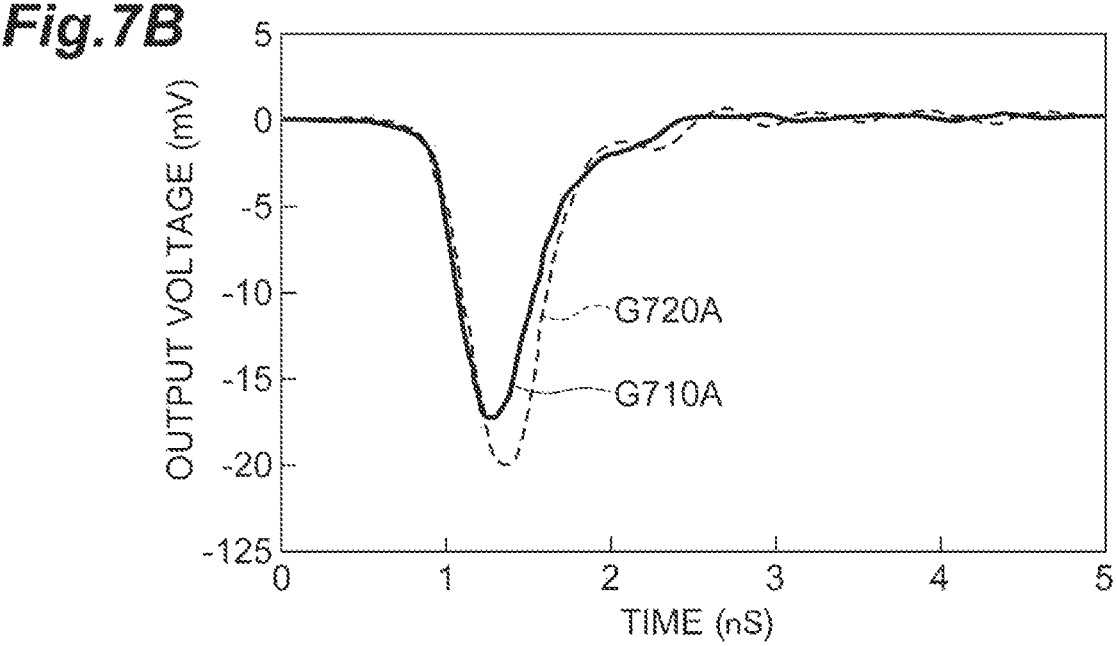
Figure 7C:
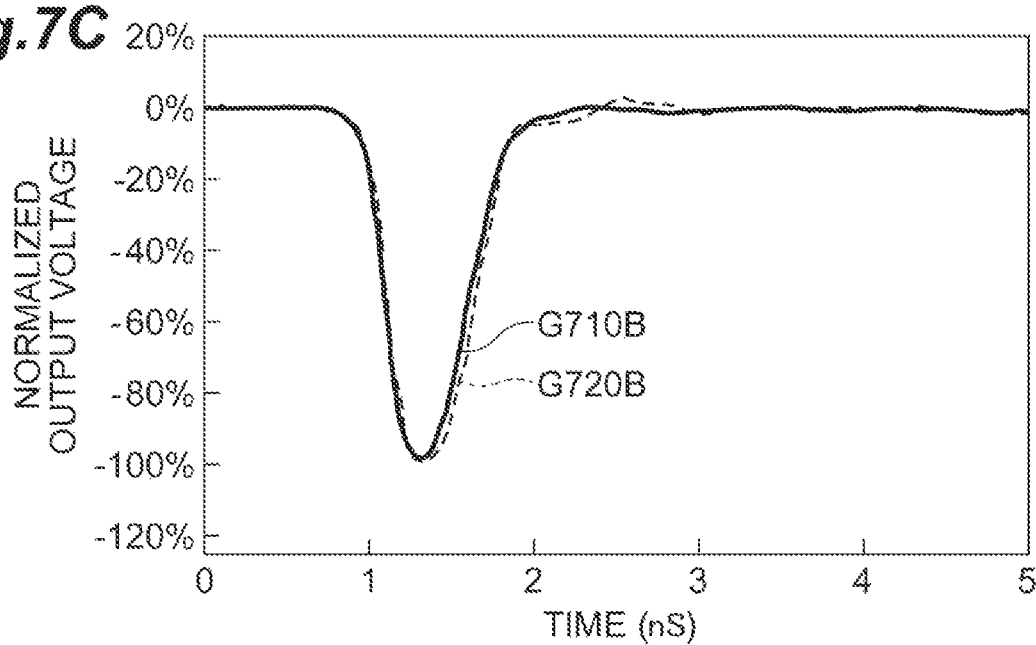

FIGS. 7A to 7C are graphs for explaining effects of the AC coupler 500 illustrated in FIGS. 6A to 6C. FIG. 7A is a circuit view of the AC coupler 500. One electrode of the signal capacitor PC1 disposed on the signal line (the electrode 501A in FIG. 6B) and one electrode of the return capacitor PC3 disposed on the return path (the electrode 502A in FIG. 6B) are connected by the resistance 520. A configuration of the periphery of the circuit including the SMA plug 120Bb, the AC coupler 500, and the SMA jack 120Cb is similar to the circuit configuration illustrated in FIG. 2A. In other words, FIG. 7A is a circuit view corresponding to a portion including the SMA plug 120B, the AC coupler 300A, and the SMA jack 120C illustrated in FIG. 2A.

FIG. 7B is a graph illustrating a measurement result (time characteristics of an output voltage) of a fourth sample that employs the AC coupler 500 and a measurement result (time characteristics of an output voltage) of the first sample. FIG. 7C is a graph illustrating time characteristics of a normalized output voltage in which the peaks of graphs G710A and G720A illustrated in FIG. 7B are adjusted to −100%. In FIG. 7B, the graph G710A illustrates the measurement result of the fourth sample, and the graph G720A illustrates the measurement result of the first sample. In FIG. 7C, a graph G710B illustrates the measurement result of the fourth sample, and a graph G720B illustrates the measurement result of the first sample.

Note that the first sample has the structure illustrated in FIG. 1A as described above. The fourth sample has the structure (MCP+AD) illustrated in FIG. 1A except that members from the anode 210 to the signal output terminal 110 are changed as illustrated in FIG. 2A. However, the fourth sample includes the AC coupler 500 having the structure illustrated in FIG. 7A instead of the AC coupler 300A. Capacitances of the signal capacitor PC1 and the return capacitor PC3 are both 150 pF. The resistance 520 is from 1 kΩ to 100 kΩ.

As seen from FIGS. 7B and 7C, the sample that employs the AC coupler 500 effectively reduces in signal reflection caused by impedance mismatch as compared with the first sample.

First Embodiment

Figure 8:
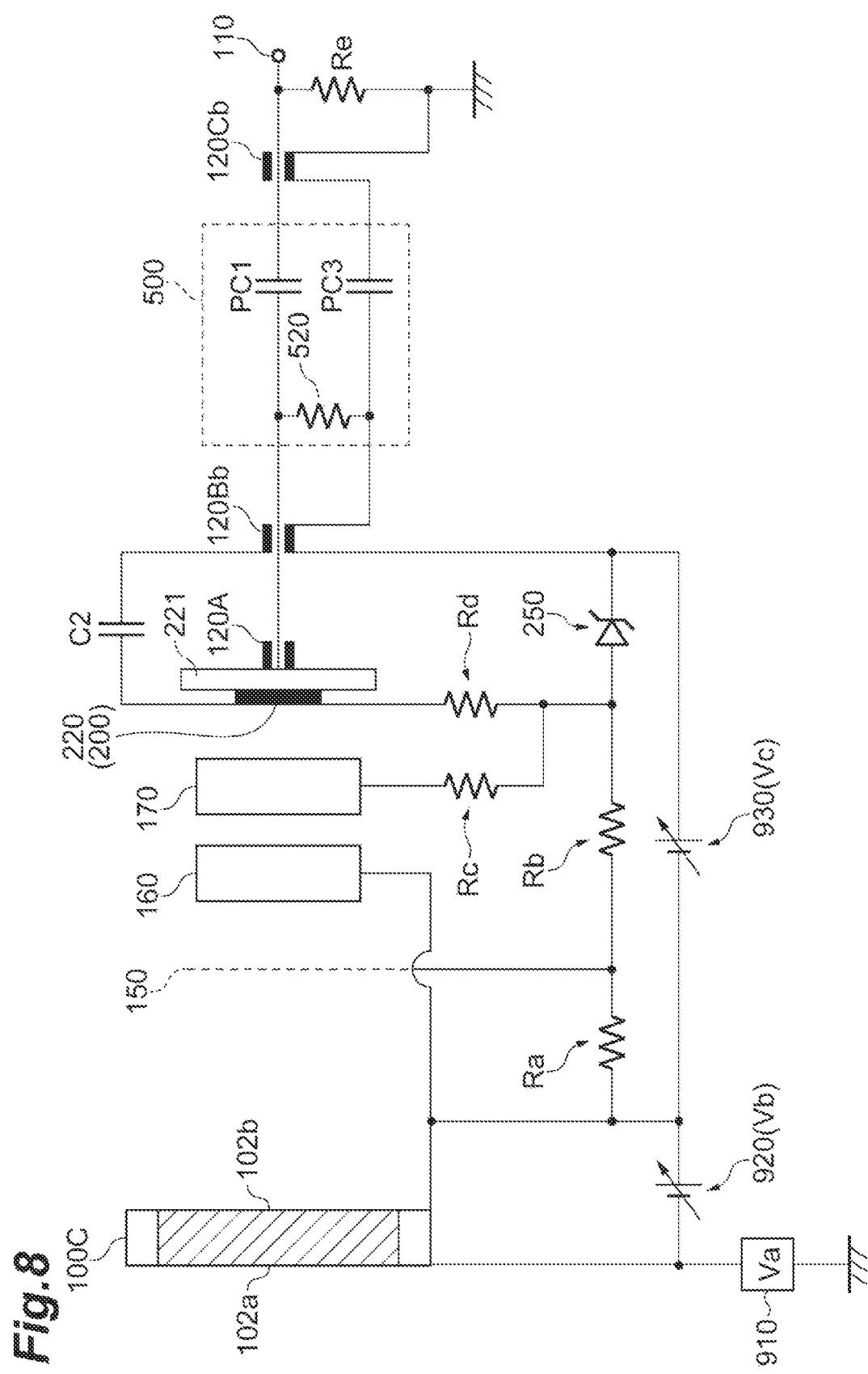
FIG. 8 is a view illustrating an example of a circuit configuration of the ion detector according to a first embodiment.

FIG. 8 is a view illustrating an example of a circuit configuration of an ion detector according to a first embodiment. The ion detector according to the first embodiment is provided with an MCP unit 100C serving as an electron multiplier, an accelerating electrode 150, a pair of focusing electrodes 160 and 170, an AD 220 serving as a signal output unit 200, an AC coupler 500, and a signal output terminal 110. The MCP unit 100C includes an MCP including an input surface 102a and an output surface 102b. Side surfaces of the MCP are surrounded by a spacer including an insulating material. Note that the MCP unit 100A illustrated in FIG. 1A may be employed instead of the MCP unit 100C. The AD 220 is mounted on an upper surface of a printed wiring board 221 (closer to the output surface 102b of the MCP), and an SMA jack 120A is mounted on a lower surface of the printed wiring board 221 (closer to the signal output terminal 110). An SMA plug 120Bb is attached to one surface of the AC coupler 500 (closer to the AD 220). An SMA jack 120Cb is attached to the other surface of the AC coupler 500 (closer to the signal output terminal 110).

The input surface 102a of the MCP unit 100C is connected to a power supply 910 and is set to have a potential Va of, for example, +10 kV or −10 kV. A power supply 920 ensures a potential difference Vb (for example, 0 V to 1 kV) between the input surface 102a and the output surface 102b. A power supply 930 ensures a potential difference Vc (for example, 0 V to 4 kV) between the output surface 102b and the SMA plug 120Bb. The potential difference (voltage) Vc set between the output surface 102b and the SMA plug 120Bb is divided by a resistance Ra (for example, 40 MΩ), a resistance Rb (for example, 20 MΩ), and a Zener diode 250 (hereinafter referred to as "ZD"). The ZD 250 ensures a potential difference of 300 V between the resistance Rb and the SMA plug 120Bb. The accelerating electrode 150 is connected to a node between the resistance Ra and the resistance Rb. The focusing electrode 160 of the pair of focusing electrodes which is closer to the output surface 102b is set to be unipotential with the output surface 102b. The focusing electrode 170 closer to the AD 220 is connected to a node between the resistance Rb and the ZD 250 via a resistance Rc (for example, 1 k ohm). The node between the resistance Rb and the ZD 250 is connected to an electron entrance surface of the AD 220 via a resistance Rd (for example, 1 kΩ). A capacitor C2 (for example, 10 nF) is disposed on a return path between the electron entrance surface of the AD 220 and the SMA plug 120Bb. When electrons continue to enter the AD 220, a voltage drop occurs on the electron entrance surface of the AD 220. In this case, fluctuations in DC component caused by the voltage drop are reflected in a signal (output voltage) outputted from the AD 220 through the signal output terminal 110. For this reason, the capacitor C2 is disposed between the electron entrance surface of the AD 220 and the SMA plug 120Bb so as to cancel fluctuations in DC component to be reflected in the output signal.

The AC coupler 500 has the structure illustrated in FIGS. 6A to 6C, including a signal capacitor PC1 (for example, 150 pF) and a return capacitor PC3 (for example, 150 pF) connected via a resistance 520 (for example, 1 kΩ to 100 kΩ). Furthermore, the SMA plug 120Bb is attached to a side of the AC coupler 500 closer to the AD 220. The SMA jack 120Cb is attached to a side of the AC coupler 500 closer to the signal output terminal 110. Side surfaces of the SMA plug 120Bb and the SMA jack 120Cb are included in a part of the return path via the return capacitor PC3, and a side surface of the SMA jack 120Cb is grounded (GND). The signal output terminal 110 is also grounded via a resistance Re.

Figure 9A:
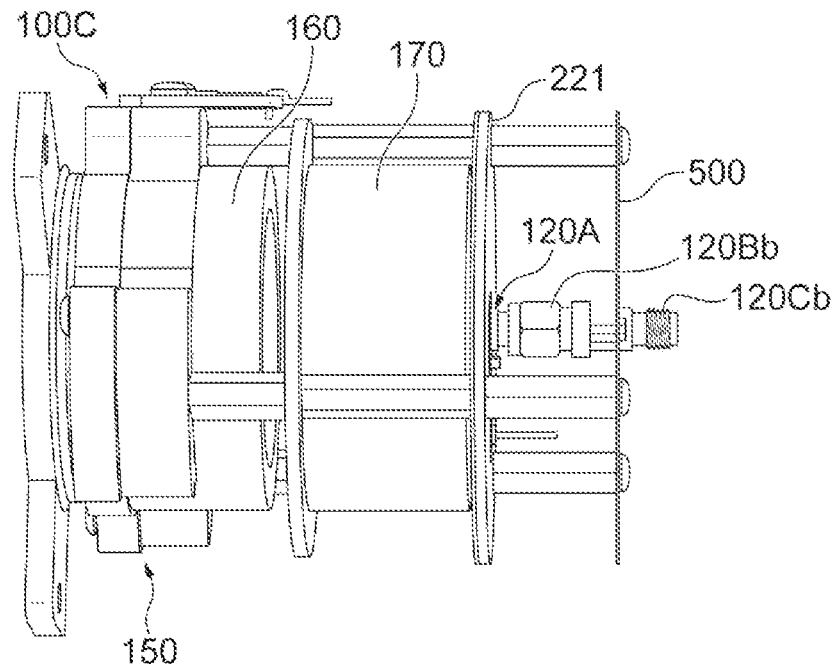
FIGS. 9A and 9B are views for explaining a part of the exterior appearance and a partial assembling process of the ion detector according to the first embodiment.
Figure 9B:
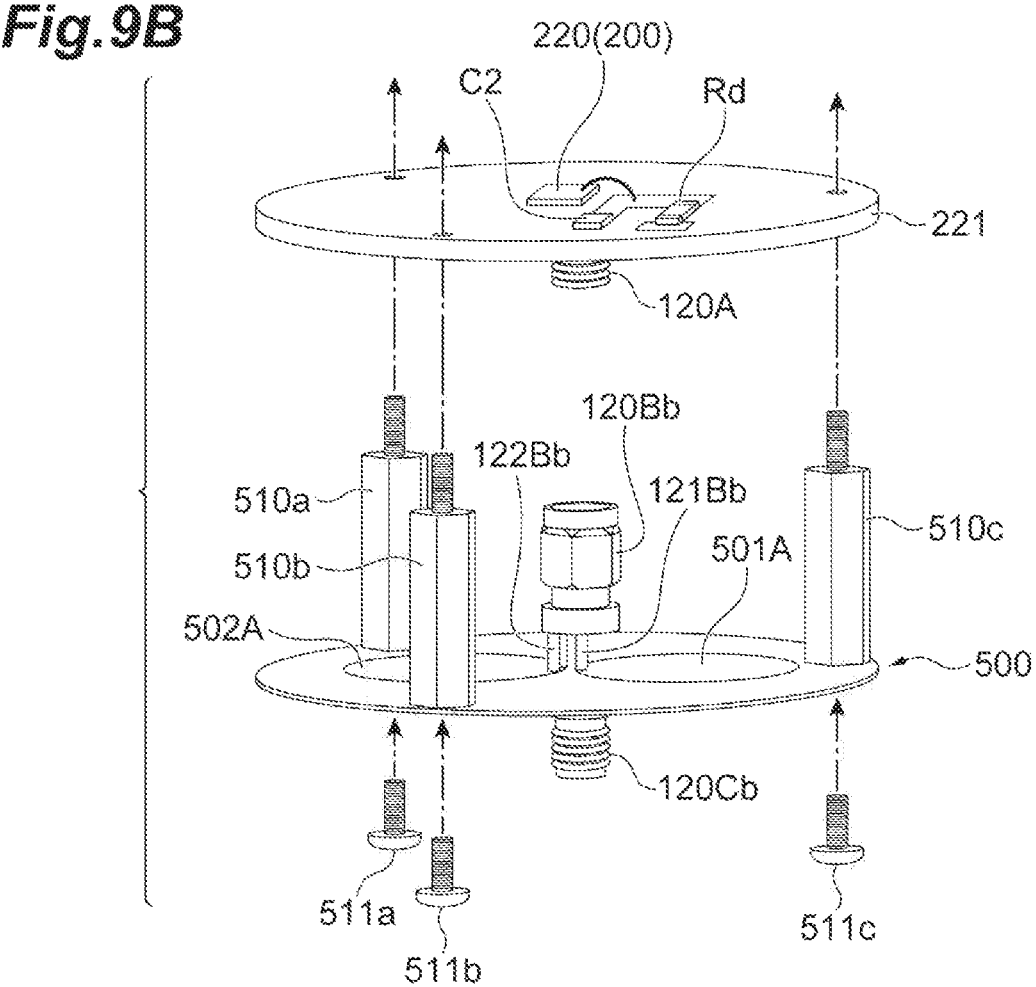

FIG. 9A is a view illustrating an example of the exterior appearance of the ion detector having the structure illustrated in FIG. 8. The MCP unit 100C, the pair of focusing electrodes 160 and 170, the printed wiring board 221 included in a part of the signal output unit, and the AC coupler 500 are fixed with spacers involved. FIG. 9B is a view for explaining a partial assembling process, particularly, for explaining the structures of the AD 220 (the signal output unit 200) and the AC coupler 500.

As illustrated in FIG. 9B, the AD 220, the capacitor C2, and the resistance Rd are disposed on the upper surface of the printed wiring board 221 (closer to the MCP unit 100C). The SMA jack 120A is attached to the lower surface of the printed wiring board 221 (closer to the signal output terminal 110). An electrode 501A of the signal capacitor PC1 and an electrode 502A of the return capacitor PC3 are connected to one surface of the AC coupler 500 (closer to the MCP unit 100C) via the resistance 520 (a protective film is not illustrated in FIG. 9B). Furthermore, a signal terminal 121Bb of the SMA plug 120Bb is soldered to the electrode 501A, and a return terminal 122Bb of the SMA plug 120Bb is soldered to the electrode 502A. On the other hand, a lower surface of the AC coupler 500 (closer to the signal output terminal 110) is provided with an electrode 501B of the signal capacitor PC1 and an electrode 502B of the return capacitor PC3. A signal terminal 121Cb of the SMA jack 120Cb is soldered to the electrode 501B, and a return terminal 122Cb of the SMA jack 120Cb is soldered to the electrode 502B. Spacers 510a to 510c each have one end fixed with resin bolts 511a to 511c to the AC coupler 500 to which the SMA plug 120Bb and the SMA jack 120Cb are attached. The other end of each of the spacers 510a to 510c are attached to the printed wiring board 221. Accordingly, the AC coupler 500 is fixed to the printed wiring board 221.

Next, an example of a reinforced structure of the AC coupler 500 applicable to the ion detector according to the first embodiment will be described with reference to FIGS. 10A, 10B, 11, and 12. Note that the term "AC coupler" herein is comprehensively defined as a device having the structure illustrated in FIGS. 4 and 5 (the AC couplers 400 and 500) and also as a device having the following reinforced structure. The AC coupler 500 according to the first embodiment has a structure in which the electrodes 501A and 502A are disposed on a main surface 550a of a resin sheet 550, while the electrodes 501B and 502B are disposed on a main surface 550b. Accordingly, the AC coupler 500 itself has flexibility. Such a feature makes it difficult for operators to handle the AC coupler 500. Therefore, a reinforced structure of the AC coupler 500 is illustrated in FIGS. 10A and 10B.

Figure 10A:
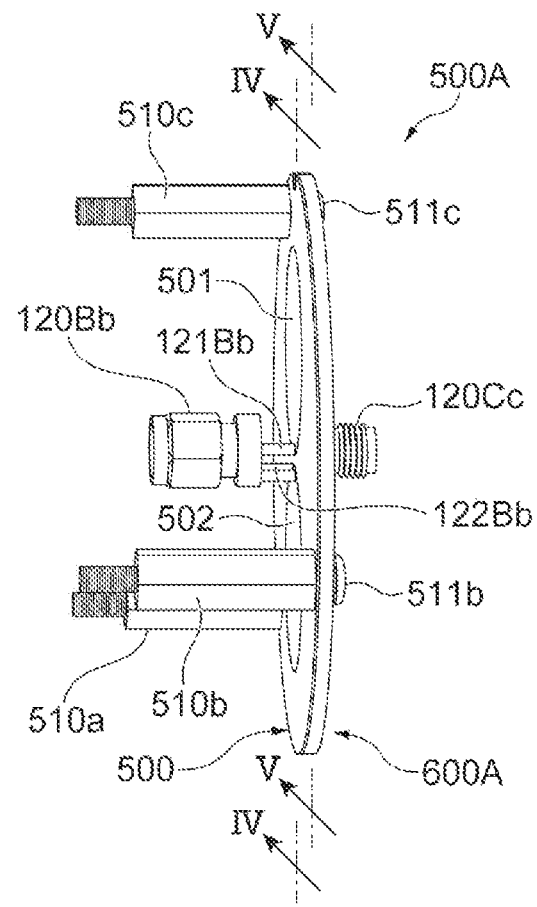
FIGS. 10A and 10B are views for explaining examples of first and second reinforced structures of an AC coupler applicable to the ion detector according to the first embodiment.

FIG. 10A illustrates a first reinforced structure in which a reinforcing plate 600A is attached to the lower surface of the AC coupler 500 with an adhesive. A cross-sectional structure along line IV-IV in FIG. 10A and a cross-sectional structure along line V-V in FIG. 10A are illustrated in FIG. 11 and in the upper part of FIG. 12. As illustrated in FIG. 11, in the first reinforced structure, the SMA plug 120Bb is soldered to the AC coupler 500. However, an SMA jack connected to the signal capacitor PC1 and the return capacitor PC3 via the reinforcing plate 600A has a different structure from the SMA jack 120Cb. In other words, an SMA jack 120Cc is attached to the reinforcing plate 600A. A signal terminal 121Cc of the SMA jack 120Cc has a leading end inserted into a through hole 601A provided in the reinforcing plate 600A and connected to the electrode 501B of the signal capacitor PC1 with a conductive adhesive 610. On the other hand, a return terminal 122Cc of the SMA jack 120Cc is shorter than the return terminal 122Cb of the SMA jack 120Cb (as illustrated in the lower part of FIG. 11, a leading end is cut off). The electrode 502B of the return capacitor PC3 is connected to a metallic wire 620 with the conductive adhesive 610, and the return terminal 122Cc of the SMA jack 120Cc is connected to the metallic wire 620 with a solder 630.

Note that an SMA jack applicable to the first reinforced structure is not limited to the SMA jack 120Cc illustrated in the lower part of FIG. 11. For example, an SMA jack 120Cd illustrated in the upper part of FIG. 12 may be employed instead of the SMA jack 120Cc. Similarly to the SMA jack 120Ca illustrated in FIG. 5, the SMA jack 120Cd does not include a return terminal but includes a fixed piece (serving as a return terminal) extending from a side surface of the SMA jack 120Cd. The fixed piece of the SMA jack 120Cd is fixed to the reinforcing plate 600A by the solder 630. Furthermore, a signal terminal 121Cd has a leading end inserted into the through hole 601A and connected to the electrode 501B of the signal capacitor PC1 with the conductive adhesive 610. On the other hand, the metallic wire 620 is connected to the electrode 502B of the return capacitor PC3 with the conductive adhesive 610, and the fixed piece of the SMA jack 120Cd is connected to the metallic wire 620 with the solder 630.

Figure 10B:
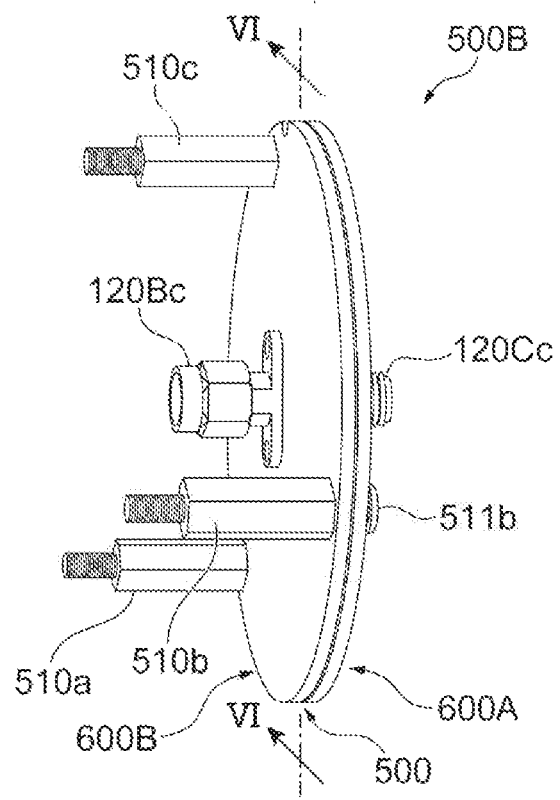

FIG. 10B illustrates a second reinforced structure in which the reinforcing plate 600A is attached to the lower surface of the AC coupler 500 with an adhesive and the reinforcing plate 600B is attached to the upper surface of the AC coupler 500 with an adhesive. The lower part of FIG. 12 shows a cross-sectional structure along line VI-VI in FIG. 10B. In the second reinforced structure, the SMA jack 120Cd is attached to the reinforcing plate 600A. An electrical connection structure between the SMA jack 120Cd and the electrodes 501B and 502B is similar to the first reinforced structure. An SMA plug Bc is attached to the reinforcing plate 600B. Similarly to the SMA jack 120Cd, the SMA plug 120Bc includes a fixed piece (serving as a return terminal) extending from a side surface. The fixed piece of the SMA plug 120Bc is fixed to the reinforcing plate 600B by the solder 630. Furthermore, a signal terminal 121Bc has a leading end inserted into a through hole 601B and connected to the electrode 501A of the signal capacitor PC1 with the conductive adhesive 610. On the other hand, the metallic wire 620 is connected to the electrode 502A of the return capacitor PC3 with the conductive adhesive 610, and the fixed piece of the SMA plug 120Bc is connected to the metallic wire 620 with the solder 630.

Modification

Figure 13A:
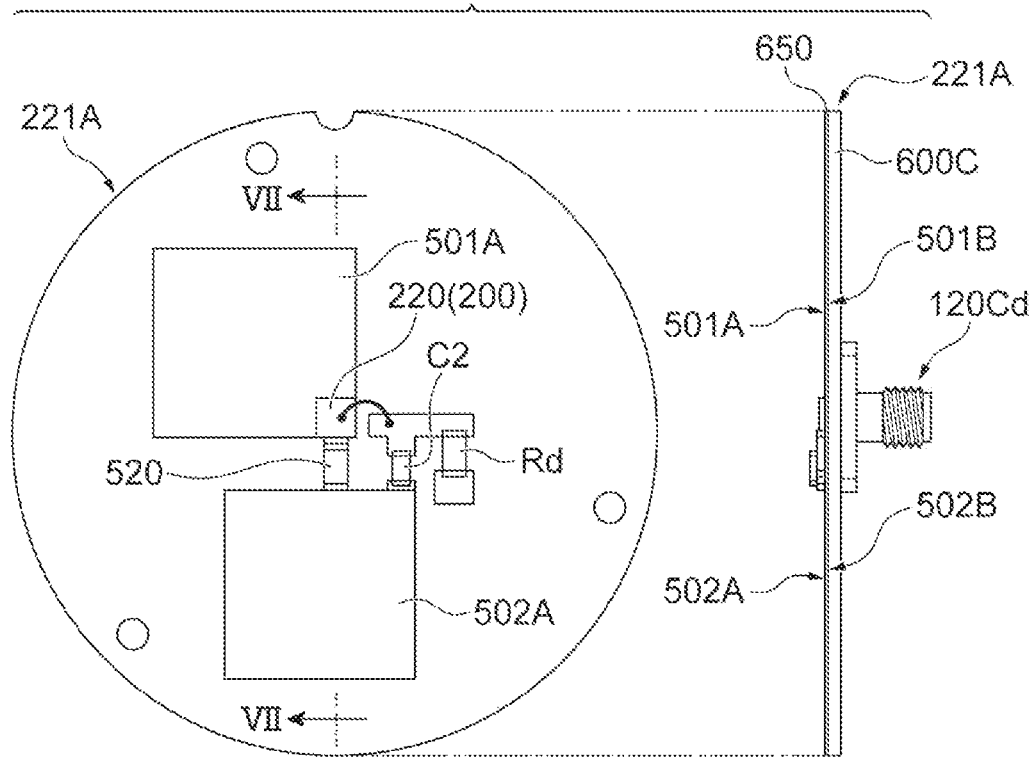
FIGS. 13A and 13B are views partially illustrating a modification of the ion detector according to the first embodiment.
Figure 13B:
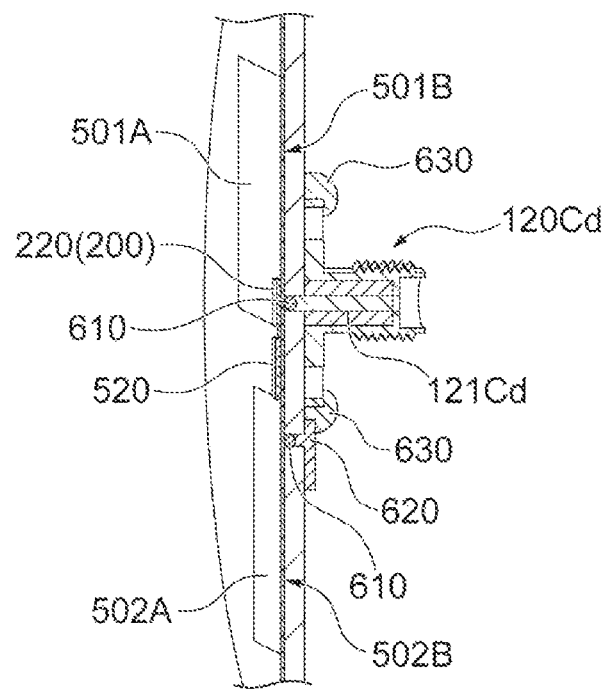

FIGS. 13A and 13B are views partially illustrating a modification of the ion detector according to the first embodiment. In the first embodiment, with the spacer 510 involved, the AC coupler 500 is attached to the printed wiring board 221A on which the AD 220 is mounted. In this modification, as illustrated in FIG. 13A, a signal capacitor PC1, a return capacitor PC3, and a resistance 520 included in an AC coupler 500 are disposed on an upper surface of a printed wiring board 221A on which an AD 220 is mounted. FIG. 13A illustrates one electrode 501A of the signal capacitor PC1 and one electrode 502A of the return capacitor PC3. Other configurations are similar to those in the first embodiment.

In other words, as illustrated in FIG. 13A, the printed wiring board 221A includes a printed wiring layer 650 attached to an upper surface of a reinforcing plate 600C (closer to an MCP unit 100C). Note that an SMA jack 120Cd is attached to a lower surface of the reinforcing plate 600C (closer to a signal output terminal 110). On one surface of the printed wiring layer 650 corresponding to the upper surface of the printed wiring board 221A (closer to the MCP unit 100C), the electrode 501A of the signal capacitor PC1, the electrode 502A of the return capacitor PC3, and the resistance 520 are mounted together with the AD 220, a resistance Rd, and a capacitor C2 (chip capacitor). On the other surface of the printed wiring layer 650, an electrode 501B of the signal capacitor PC1 and an electrode 502B of the return capacitor PC3 are disposed. Accordingly, the electrodes 501B and 502B are sandwiched between the printed wiring layer 650 and the reinforcing plate 600C.

FIG. 13B is a view illustrating a cross-sectional structure of the printed wiring board 221A along line VII-VII in FIG. 13A. As described above, the SMA jack 120Cd is disposed on the lower surface of the reinforcing plate 600C (closer to the signal output terminal 110). The structure in which the SMA jack 120Cd is electrically connected to the electrodes 501B and 502B via the reinforcing plate 600C is similar to the cross-sectional structure illustrated in the upper and lower parts of FIG. 12.

Second Embodiment

Figure 14:
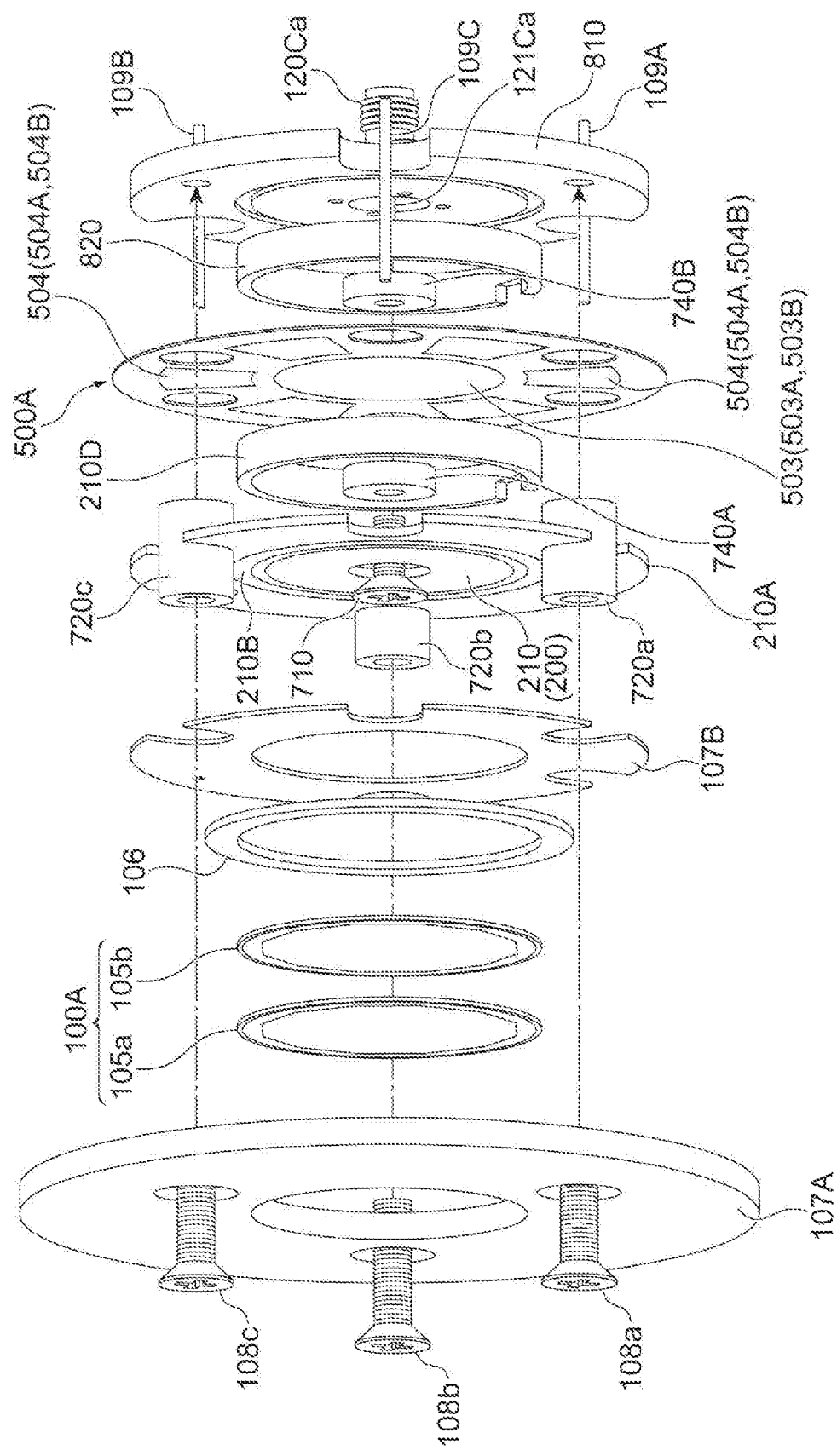
FIG. 14 is a view illustrating a partial configuration example of an ion detector according to a second embodiment.

FIG. 14 is a view illustrating a partial configuration example of an ion detector according to a second embodiment. On a conceptual basis, the ion detector according to the second embodiment has a basic structure in which the ion detector illustrated in FIG. 1A employs an AC coupler 500A having a third structure. However, in the ion detector according to the second embodiment, an anode 210 (included in a signal output unit 200) and the AC coupler 500A are formed in an integrated manner.

The AC coupler 500A employed in the second embodiment includes a resin sheet having both surfaces provided with the same electrode pattern. In other words, in the AC coupler 500A having the third structure, a pair of electrodes 503 included in a signal capacitor PC1 is disposed at the center of the resin sheet, and the signal capacitor PC1 is surrounded by six pairs of electrodes 504 included in six return capacitors PC3. Note that the pair of electrodes 503 includes electrodes 503A and 503B disposed with a resin sheet interposed therebetween. Furthermore, each pair of electrodes 504 includes electrodes 504A and 504B arranged with a resin sheet interposed therebetween.

The ion detector according to the second embodiment includes an MCP unit 100A including a pair of MCPs 105a and 105b. A side surface of the MCP unit 100A is surrounded by an insulating ring 106, and the MCP unit 100A and the insulating ring 106 are sandwiched between an MCP-In electrode 107A and an MCP-Out electrode 107B. The MCP-In electrode 107A is an electrode for setting an input surface of the MCP unit 100A to have a predetermined potential via a lead pin 109A and includes an opening for exposing the input surface of the MCP unit 100A. Furthermore, the MCP-Out electrode 107B is an electrode for setting an output surface of the MCP unit 100A to have a predetermined potential via a lead pin 109B and includes an opening for exposing the output surface of the MCP unit 100A.

The anode 210 (included in the signal output unit 200) is disposed between the MCP-Out electrode 107B and the AC coupler 500A, directly facing the output surface of the MCP unit 100A via the opening of the MCP-Out electrode 107B. The anode 210 is disposed on both surfaces of a glass epoxy substrate 210A, and the anodes 210 on the both surfaces are set to be unipotential via a through hole. The anode 210 is set to have a predetermined potential via a lead pin 109C. Furthermore, on both surfaces of the glass epoxy substrate 210A, a return electrode 210B is disposed to surround the anode 210. One return electrode 210B is in contact with the MCP-Out electrode 107B. The return electrodes 210B on the both surfaces of the glass epoxy substrate 210A are also set to be unipotential via the through hole. The center of the glass epoxy substrate 210A (corresponding to the center of each of the pair of electrodes 503A and 503B) is provided with the through hole to which a metallic joint 710 is fixed. One end of the metallic joint 710 is in contact with (electrically connected to) the anode 210, while the other end of the metallic joint 710 is in contact with (electrically connected to) the electrode 503A (one electrode of the signal capacitor PC1) via a through hole of a conductive ring 740A. A metallic ring 210D is disposed between the AC coupler 500A and the glass epoxy substrate 210A having both surfaces provided with the anode 210. One surface of the metallic ring 210D is in contact with the return electrode 210B, while the other surface of the metallic ring 210D is in contact with the six electrodes 504A (each corresponding to one electrode of the return capacitor PC3). With this configuration, the six electrodes 504A are set to be unipotential with the MCP-Out electrode 107B.

The AC coupler 500A is sandwiched between the glass epoxy substrate 210A and a metallic base substrate 810. The conductive ring 740A and the metallic ring 210D are disposed between the glass epoxy substrate 210A and the AC coupler 500A. These rings maintain a certain distance between the glass epoxy substrate 210A and the AC coupler 500A. Furthermore, a conductive ring 740B and a metallic ring 820 are disposed between the AC coupler 500A and the metallic base substrate 810, and these rings maintain a certain distance between the AC coupler 500A and the metallic base substrate 810. Here, the metallic ring 820 is in contact with each of the six electrodes 504B (the other electrode of the return capacitor PC3).

The metallic base substrate 810 includes an opening that allows a signal terminal 121Ca of a SMA jack 120Ca to penetrate therethrough and has one surface provided with the metallic ring 820 that sets the six electrodes 504B to be unipotential. The SMA jack 120Ca has the structure illustrated in FIG. 5. The signal terminal 121Ca is in contact with the electrode 503B (the other electrode of the signal capacitor PC1) via the through hole of the conductive ring 740B. A contact surface 122Ca of the SMA jack 120Ca is fixed to the metallic base substrate 810 while being in contact with the other surface of the metallic base substrate 810. Accordingly, the contact surface 122Ca is included in a part of a return path. Furthermore, insulating spacers 720a to 720c ensure a distance between the metallic base substrate 810 and the MCP-In electrode 107A. Relative positions of the metallic base substrate 810 and the MCP-In electrode 107A are determined by resin bolts 108a to 108c.

Third Embodiment

Figure 15:
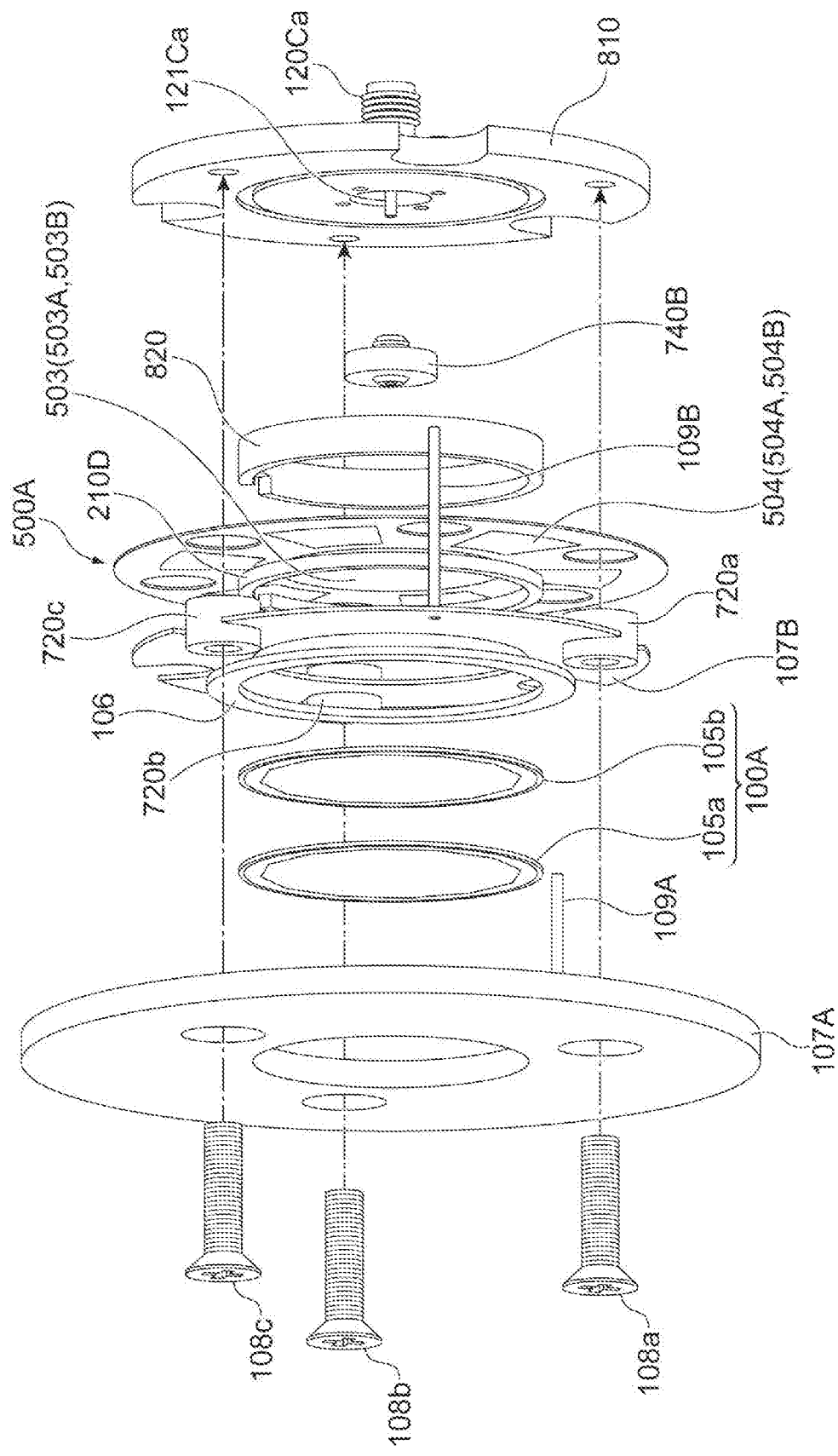
FIG. 15 is a view illustrating a partial configuration example of an ion detector according to a third embodiment.

FIG. 15 is a view illustrating a partial configuration example of an ion detector according to a third embodiment. Similarly to the ion detector according to the second embodiment, the ion detector according to the third embodiment employs an AC coupler 500A. However, the third embodiment is different from the second embodiment in that one electrode of a signal capacitor PC1 at the center of the AC coupler 500A serves as an anode (the anode 210 in FIG. 14). In other words, in the ion detector according to the third embodiment, the AC coupler 500A doubles as an anode or a signal output unit and as a signal capacitor.

The third embodiment employs an AC coupler that has the same structure as the AC coupler 500A according to the second embodiment. In other words, the AC coupler 500A herein includes a resin sheet having both surfaces provided with the same electrode pattern. In the AC coupler 500A, a pair of electrodes 503 included in a signal capacitor PC1 is disposed at the center of the resin sheet, and the signal capacitor PC1 is surrounded by six pairs of electrodes 504 included in six return capacitors PC3. Note that the pair of electrodes 503 includes electrodes 503A and 503B disposed with a resin sheet interposed therebetween. Furthermore, each pair of electrodes 504 includes electrodes 504A and 504B arranged with a resin sheet interposed therebetween.

Similarly to the second embodiment, the ion detector according to the third embodiment has a structure for setting an input surface and an output surface of an MCP unit 100A to have a predetermined potential. In other words, a side surface of the MCP unit 100A including two MCPs 105a and 105b is surrounded by an insulating ring 106. Furthermore, the MCP unit 100A and the insulating ring 106 are sandwiched between an MCP-In electrode 107A set to have a predetermined potential via a lead pin 109A and an MCP-Out electrode 107B set to have a predetermined potential via a lead pin 109B. The MCP-In electrode 107A has an opening that exposes the input surface of the MCP unit 100A, and the MCP-Out electrode 107B has an opening that exposes the output surface of the MCP unit 100A.

On the other hand, the AC coupler 500A is sandwiched between the MCP-Out electrode 107B and a metallic base substrate 810. In particular, a metallic ring 210D is disposed between the AC coupler 500A and the MCP-Out electrode 107B, and via this metallic ring 210D, the MCP-Out electrode 107B and the six electrodes 504A (one electrode of the return capacitor PC3) are set to be unipotential. With this configuration, the electrode 503A (one electrode of the signal capacitor PC1) serving as an anode directly faces the output surface of the MCP unit 100A via the opening of MCP-Out electrode 107B. Note that the metallic base substrate 810 is disposed on a side of the AC coupler 500A on which the electrodes 503B and 504B are disposed.

The metallic base substrate 810 includes an opening that allows a signal terminal 121Ca of a SMA jack 120Ca to penetrate therethrough and has one surface provided with a metallic ring 820 that sets the six electrodes 504B to be unipotential. The SMA jack 120Ca has the structure illustrated in FIG. 5. The signal terminal 121Ca is in contact with the electrode 503B (the other electrode of the signal capacitor PC1) via a conductive ring 740B. A contact surface 122Ca of the SMA jack 120Ca is fixed to the metallic base substrate 810 while being in contact with the other surface of the metallic base substrate 810. Accordingly, the contact surface 122Ca is included in a part of a return path. Furthermore, insulating spacers 720a to 720c ensure a distance between the metallic base substrate 810 and the MCP-In electrode 107A. Relative positions of the metallic base substrate 810 and the MCP-In electrode 107A are determined by resin bolts 108a to 108c.

As described above, the ion detector according to this embodiment makes it possible to reduce influences of signal reflection or the like on an output signal.

It is clear from the description of the present invention that the present invention may employ various modifications. Such modifications are not allowed to depart from the spirit and scope of the invention, and modifications obvious to those skilled in the art are intended to be included in the scope of the following claims.

What is claimed is:

1. An ion detector comprising:
   an electron multiplier configured to emit an electron in response to an incident charged particle;
   a signal output unit disposed at a position where the electron emitted from the electron multiplier arrives, the signal output unit being configured to receive the electron and output an electric signal;
   a signal output terminal connected to an output terminal of the signal output unit via a signal line;
   an AC coupler disposed on the signal line; and
   a printed wiring board on which the signal output unit and the AC coupler are mounted;
   wherein the printed wiring board comprises:
   a reinforcing plate having an upper surface facing the signal output unit, and a lower surface facing to the signal output terminal; and
   a printed wiring layer attached on the upper surface of the reinforcing plate, the printed wiring layer having a first main surface on which the signal output unit is mounted, and a second main surface facing the upper surface of the reinforcing plate,
   wherein the AC coupler comprises:
   a first conductive section disposed on the first main surface of the printed wiring layer and electrically connected to the output terminal of the signal output unit; and
   a second conductive section electrically connected to the signal output terminal and disposed on the second main surface of the printed wiring layer in such a manner that at least a part of the second conductive section overlaps with the first conductive section when the printed wiring layer is viewed along a direction from the first main surface to the second main surface, the second conductive section being sandwiched with the second main surface and the upper surface while the printed wiring layer is attached on the reinforcing plate.

2. The ion detector according to claim 1, wherein the reinforcing plate has a through hole connecting the upper surface and the lower surface, and an opening of the through hole, which is positioned on the upper surface, is entirely covered by the second conductive section.

3. The ion detector according to claim 2, further comprising a connecting member having a signal terminal constituting a part of the signal line and is attached on the lower surface of the reinforcing plate while a part of the signal terminal of the connecting member is inserted in the through holes.

4. The ion detector according to claim 1, wherein the first conductive section includes a plurality of first conductive parts and the second conductive section has a plurality of second conductive parts each prepared so as to correspond to one of the plurality of first conductive parts, and
   one of the plurality of first conductive parts and the associated one of the plurality of second conductive parts constitutes a capacitor.

5. The ion detector according to claim 4, further comprising a connecting member having a signal terminal constituting a part of the signal line and is attached on the lower surface of the reinforcing plate, the signal terminal of the connecting member being electrically connected to one of the second conductive parts.

* * * * *